US006612510B1

(12) United States Patent
Fox et al.

(10) Patent No.: US 6,612,510 B1
(45) **Date of Patent: *Sep. 2, 2003**

(54) AEROSOL SPRAYING

(75) Inventors: Rodney Thomas Fox, Cottingham (GB); Neale Harrison, Staffordshire (GB); John Farrell Hughes, Southampton (GB); Duncan Roger Harper, Hull (GB); Lindsey Faye Whitmore, Winchester (GB)

(73) Assignees: University of Southampton, Southampton (GB); Reckitt Benckiser (UK) Limited, Slough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/720,887

(22) PCT Filed: Jun. 23, 1999

(86) PCT No.: PCT/GB99/01960

§ 371 (c)(1),
(2), (4) Date: Jun. 8, 2001

(87) PCT Pub. No.: WO00/01493

PCT Pub. Date: Jan. 13, 2000

(30) Foreign Application Priority Data

Jul. 2, 1998 (GB) ............................................ 9814370

(51) Int. Cl.$^{7}$ ........................ A01G 23/10; B05B 5/025; B05B 5/00; F23D 11/32

(52) U.S. Cl. ........................ 239/690.1; 239/690; 239/3

(58) Field of Search .............................. 239/690.1, 690, 239/337, 493, 708, 3, 8, 491, 706, 601, DIG. 14

(56) References Cited

U.S. PATENT DOCUMENTS

| | | | | |
|---|---|---|---|---|
| 4,540,990 A | * | 9/1985 | Crean | 346/75 |
| 4,776,515 A | * | 10/1988 | Michalchik | 239/3 |
| 5,400,975 A | * | 3/1995 | Inculet et al. | 239/690.1 |
| 6,199,766 B1 | * | 3/2001 | Fox et al. | 239/3 |
| 6,279,834 B1 | * | 8/2001 | Fox et al. | 239/3 |

* cited by examiner

*Primary Examiner*—Davis Hwu
(74) *Attorney, Agent, or Firm*—Fish & Richardson P.C.

(57) ABSTRACT

A method of improving the spraying of liquid droplets from a spray device onto a surface which method comprises imparting a unipolar charge to the said liquid droplets by double layer charging during the spraying of the liquid droplets from the spray device, the unipolar charge being at a level such that the said droplets have a charge to mass ratio of at least $\pm 1\times10^{-4}$ C/kg, whereby the charged droplets of the liquid are mutually repelled thereby increasing the spread of the droplets from a central spray line extending from the head of the spray device and avoiding coalescence of the droplets, thus providing a more even coverage of the surface which is to be sprayed. In particular, the method enables liquid droplets to be sprayed onto a surface which is obscured by all object located between the surface and the spray device.

16 Claims, 5 Drawing Sheets

No Charge

AEROSOL SPRAYING

The present invention relates to a method of spraying aerosols which are created during the spraying process from a liquid composition located within a container by forcing the liquid through a suitable spray head attached to the container from which it emerges in aerosol form.

The present invention is particularly concerned with the formation of aerosols using domestic aerosols spray devices. Such devices may contain liquid compositions capable of forming aerosols for use in a wide range of applications including disinfectants, paints, antiperspirants, deodorants and insecticides. Reference will be made hereinafter to disinfectant applications but it should be appreciated that the present invention may be of use in connection with many other aerosol applications.

Dispersion of compositions from an aerosol spray device is not ideal as the spray of liquid droplets emerging from the aerosol device is generally propelled by sufficient force to enable the liquid droplets only to travel more or less in a straight line with a relatively small spread angle for a distance perhaps of the order of 1 meter or more. This is because of the restrictions on the design of the spray head including the outlet orifice. During their travel, the liquid droplets will, until they lose momentum, tend to maintain a straight line path although some attraction may take place between individual liquid droplets causing coalescence between one or more droplets, thereby possibly reducing the spread of droplets from a central spray line extending from the spray head.

In the case of a disinfectant product, the aim of the user is to spray an aerosol disinfectant from the spray device in a manner such that the liquid droplets make contact with microorganisms, typically in the form of bacteria, viruses or fungal spores. Microorganisms tend to accumulate on or adjacent to surfaces which are relatively difficult to access, for example, surfaces located behind the pedestals, handles and rims of sinks, showers, toilets or wash basins. A conventional aerosol spray device, when operated so that the spray is directed in the general direction of these inaccessible areas, will result in the liquid droplets encountering the surfaces of objects which lie between the spray device and the inaccessible areas. Accordingly, the liquid droplets will impinge on these objects and will never make contact with the desired target areas. Furthermore, it is difficult to ensure that a spray of, for example, a disinfectant composition will reach into all of the corners, crevices, pits, hollows and other areas of a surface which are difficult to access. With conventional techniques it is therefore difficult to sterilise the surfaces of operating theatres, hospital wards and other institutions.

We have now developed an improved method of spraying compositions which enables the liquid droplets of the compositions to cover and target surfaces more effectively and, in particular, which enables the droplets to target obscured or partly obscured surfaces.

According, to the present invention there is provided a method of improving the spraying of liquid droplets from a spray device onto a surface which method comprises imparting a unipolar charge to the said liquid droplets by double layer charging during the spraying of the liquid droplets from the spray device, the unipolar charge being at a level such that the said droplets have a charge to mass ratio of at least $+/-1\times10^{-4}$ C/kg, whereby the charged droplets of the liquid are mutually repelled thereby increasing the spread of the droplets from a central spray line extending from the head of the spray device and avoiding coalescence of the droplets, thus providing a more even coverage of the surface which is to be sprayed.

In a particular aspect of the present invention there is provided a method of spraying liquid droplets from a spray device onto a surface which is obscured by an object located between the surface and the spray device so that liquid droplets travelling in a straight line from the spray device to the surface will impinge on said object, the method comprising imparting a unipolar charge to the said liquid droplets by double layer charging during the spraying of the liquid droplets from the spray device, the unipolar charge being at a level such that the said droplets have a charge to mass ratio of at least $+/-1\times10^{-4}$ C/kg, whereby at least some of the droplets are caused to travel in a path which avoids the object and impinges on the obscured surface.

It will be understood that the object which obscures the surface which it is desired to spray may be a part of the same article as the article possessing the said surface. The invention is thus applicable to the treatment of three dimensional articles where certain surfaces are obscured from View along a particular line of sight. Accordingly, at least a part of the obverse surfaces of articles may be sprayed with liquid droplets using the method of the invention.

It is preferred that the unipolar charge which is imparted to the liquid droplets is generated solely by the interaction between the liquid within the spray device and the spray device itself as the liquid is expelled therefrom. In particular, it is preferred that the manner in which a unipolar charge is imparted to the liquid droplets does not rely even partly upon the connection of the spray device to any external charge inducing device, such as a source of relatively high voltage, or internal charge inducing device, such as a battery. With such an arrangement, the spray device is entirely self-contained, making it suitable for use both in industrial, institutional and domestic situations.

Preferably, the spray device is a domestic pressure-spraying device devoid of any electrical circuitry but which is capable of being hand held. Typically such a device has a capacity in the range of from 10 ml to 2000 ml and can be actuated by hand, or by an automatic actuating mechanism. A particularly preferred domestic device is a hand-held aerosol can.

Preferably, therefore the droplet charge to mass ratio of at least $+/-1\times10^{-4}$ C/kg is imparted to the liquid droplets as a result of the use of an aerosol spray device with at least one of the features of the material of the actuator, the size and shape of the orifice of the actuator, the diameter of the dip tube, the characteristics of the valve and the formulation of the composition contained in the aerosol spray device being chosen in order to achieve the said droplet charge to mass ratio by double layer charging imparting the unipolar charge to the droplets during the actual spraying of the liquid droplets from the orifice of the aerosol spray device.

As a result of the method of the present invention surfaces which are normally difficult to access or inaccessible to the spray from an aerosol spray device can be contacted by the spray, thereby rendering many operations much more manageable. By way of example, microorganisms such as bacteria located in areas which are normally difficult to access may be easily eliminated in accordance with the method of the invention.

The method of the present invention may be used, for example, to spray an obscured surface of a sink, shower, toilet, washbasin, chair leg, a handle of a door, cupboard or refrigerator, a part of a human body, or a part of a plant with a liquid composition such as a disinfectant or antimicrobial composition. The method of the invention may also be used to improve the targeting of certain products to their intended destination. For example, more effective spraying of hairsprays, antiperspirants, body sprays, waxes and polishes, oven cleaners, starches and fabric finishes, shoe and leather ware products, glass cleaners, paints, lubricants, house plant sprays, antistick compositions, insecticides, herbicides, fungicides, biopesticides, disinfectants, and various other household, institutional, professional or industrial products may be achieved, with a reduction in the amount of product required to be used and a reduction in the amount of the product which does not impinge upon the target.

The result of the method of the invention is achieved because of the unipolar charge imparted to the liquid droplets of the aerosol spray. This charge has two effects. First, the droplets, since they carried the same polarity charge, are repelled one from another. Accordingly, there is little or no coalescence of the droplets. Rather they tend to spread out to a great extent during their path of travel, thereby following a curved path. In addition, if the repulsive forces from the charge within the droplets is greater than the surface tension force of the droplets, the charged droplets are caused to fragment into a plurality of smaller charged droplets (exceeding the Rayleigh limit). This process continues until either the two opposing forces are equalised or the droplet has fully evaporated.

Secondly, the liquid droplets carrying the unipolar charge are attracted to grounded conducting surfaces such as wood, metal or ceramics by interaction with their image charge. If non-conducting surfaces carry an opposite polarity charge to that of the liquid droplets, then attraction will equally be effected. Those liquid droplets that are attracted to the surface are able to cover the surface much more evenly than with uncharged droplets as at the same time as they are being attracted to the surface, they are also repelling one another.

Accordingly, those liquid droplets which proceed past the obscuring object and are not travelling in a direction towards the target surface, will tend to be attracted towards the target surface and therefore their path of travel follows a curve terminating at the surface.

It will be appreciated that the two effects can be cumulative such that some at least of the liquid droplets will follow a significantly curved path of travel from the aerosol spray device, past the obscuring object and into contact with the target surface.

The liquid composition which is sprayed into the air using the aerosol spray device is preferably a water and hydrocarbon mixture, or emulsion, or a liquid which is converted into an emulsion by shaking the spraying device before use, or during the spraying process.

Whilst all liquid aerosols are known to carry a net negative or positive charge as a result of double layer charging, or the fragmentation of liquid droplets, the charge imparted to droplets of liquid sprayed from standard devices is only of the order of $+/-1\times10^{-8}$ to $1\times10^{-5}$ C/kg.

The invention relies on combining various characteristics of the design of an aerosol spray device so as to increase the charging of the liquid as it is sprayed from the aerosol spray device.

A typical aerosol spray device comprises:

1. An aerosol can containing the composition to be sprayed from the device and a liquid or gaseous propellant.
2. A dip tube extending into the can, the upper end of the dip tube being connected to a valve;
3. An actuator situated above the valve which is capable of being depressed in order to operate the valve; and
4. An insert provided in the actuator comprising an orifice from which the composition is sprayed.

A preferred aerosol spray device for use in the present invention is described in WO 97/12227.

It is possible to impart higher charges to the liquid droplets by choosing aspects of the aerosol device including the material, shape and dimensions of the actuator, the actuator insert, the valve and the diptube and the characteristics of the liquid which is to be sprayed, so that the required level of charge is generated as the liquid is dispersed as droplets.

A number of characteristics of the aerosol system increase double layer charging and charge exchange between the liquid formulation and the surfaces of the aerosol system. Such increases are brought about by factors which may increase the turbulence of the flow through the system, and increase the frequency and velocity of contact between the liquid and the internal surfaces of the container and valve and actuator system.

By way of example, characteristics of the actuator can be optimised to increase the charge levels on the liquid sprayed from the container. A smaller orifice in the actuator insert, of a size of 0.45 mm or less, increases the charge level of the liquid sprayed through the actuator. The choice of material for the actuator can also increase the charge level on the liquid sprayed from the device with material such as nylon, polyester, acetal, PVC and polypropylene tending to increase the charge level. The geometry of the orifice in the insert can be optimised to increase the charge level on the liquid as it is sprayed through the actuator. Inserts which promote the mechanical break-up of the liquid give better charging.

The actuator insert of the spray device may be formed from a conducting, insulating, semi-conducting or static-dissipative material.

The characteristics of the dip tube can be optimised to increase the charge level in the liquid sprayed from the container. A narrow dip tube, of for example about 1.27 mm internal diameter, increases the charge level on the liquid, and the dip tube material can also be changed to increase charge.

Valve characteristics can be selected which increase the charge to mass ratio of the liquid product as it is sprayed from the container. A small tailpiece orifice in the housing, of about 0.65 mm, increases product charge to mass ratio during spraying. A reduced number of holes in the stem, for example 2×0.50 mm, also increase product charge during spray. The presence of a vapour phase tap helps to maximise the charge level, a larger orifice vapour phase tap of, for example, about 0.50 mm to 1.0 mm generally giving higher charge level.

Changes in the product formulation can also affect charging levels. A formulation containing a mixture of hydrocarbon and water, or an emulsion of an immiscible hydrocarbon and water, will carry a higher charge to mass ratio when sprayed from the aerosol device than either a water alone or hydrocarbon alone formulation.

It is preferred that an aerosol spray composition of use in the present invention comprises an oil phase, an aqueous phase, a surfactant and a propellant.

Preferably the oil phase includes $C_9$–$C_{12}$ hydrocarbon which is preferably present in the composition in the amount of from 2 to 10% w/w.

Preferably the surfactant is glyceryl oleate or a polyglycerol oleate, preferably present in the composition in an amount of from 0.1 to 1.0% w/w.

Preferably the propellant is liquified petroleum gas (LPG) which is preferably butane, optionally in admixture with propane. The propellant may be present in an amount of from 10 to 90% w/w depending upon whether the composition is intended for spraying as a "wet" or as a "dry" composition. For a "wet" composition, the propellant is preferably present in an amount of from 20 to 50% w/w, more preferably in an amount of from 30 to 40% w/w.

The liquid droplets sprayed from the aerosol spray device will generally have diameters in the range of from 5 to 100 micrometers, with a peak of droplets of about 40 micrometers. The liquid which is sprayed from the aerosol spray device may contain a predetermined amount of a particulate material, for example, fumed silica, or a predetermined amount of a volatile solid material, such as menthol or naphthalene.

A can for a typical aerosol spray device is formed of aluminium or lacquered or unlacquered tin plate or the like. The actuator insert may be formed or, for instance, acetal resin. The valve stem lateral opening may typically be in the form of two apertures of diameters 0.51 mm.

The present invention will now be described, by way of examples only, with reference to the accompanying drawings, in which.

Figure 1:
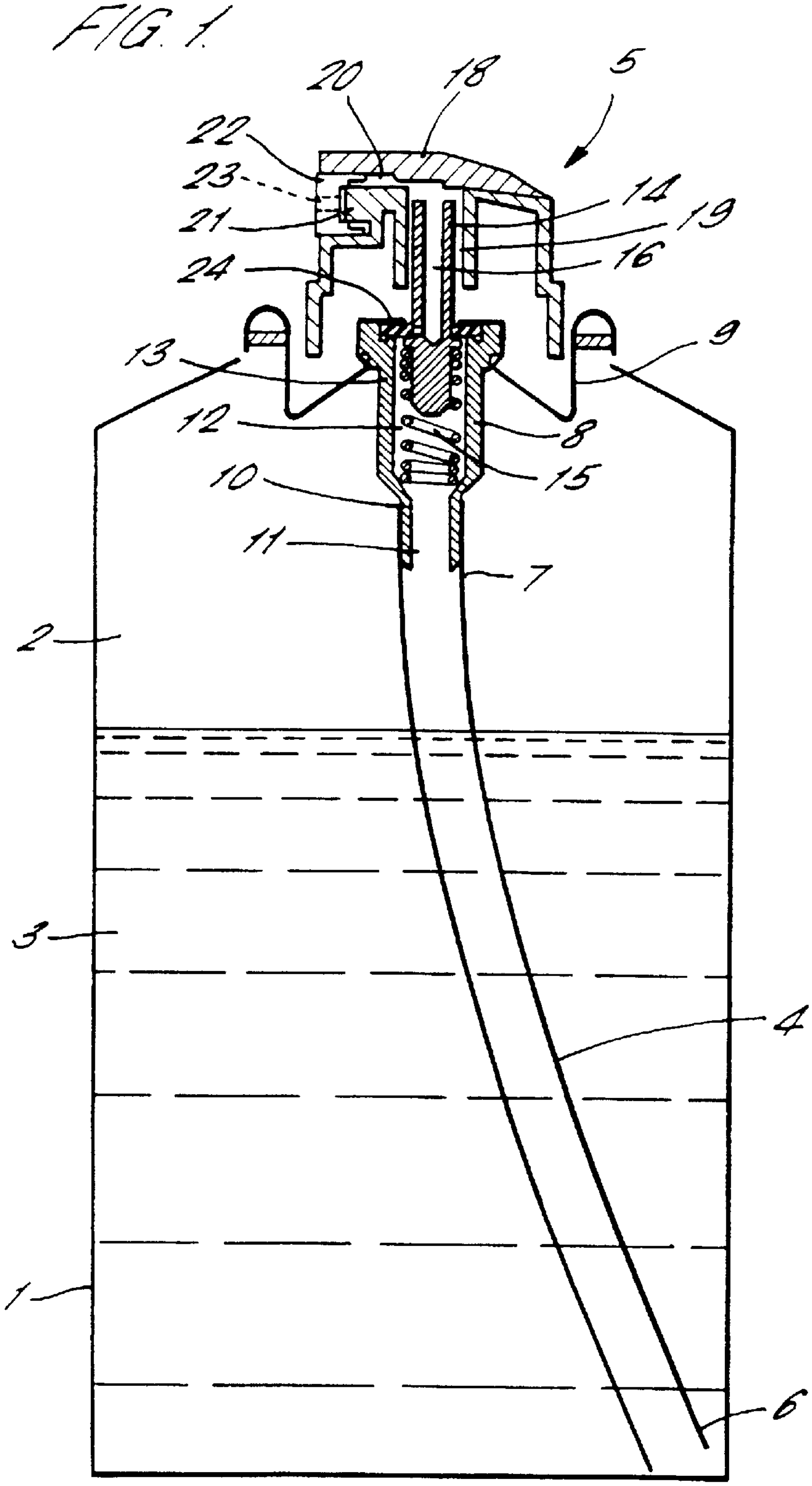
FIG. 1 is a diagrammatic cross section through an aerosol spraying apparatus in accordance with the invention.
Figure 2:
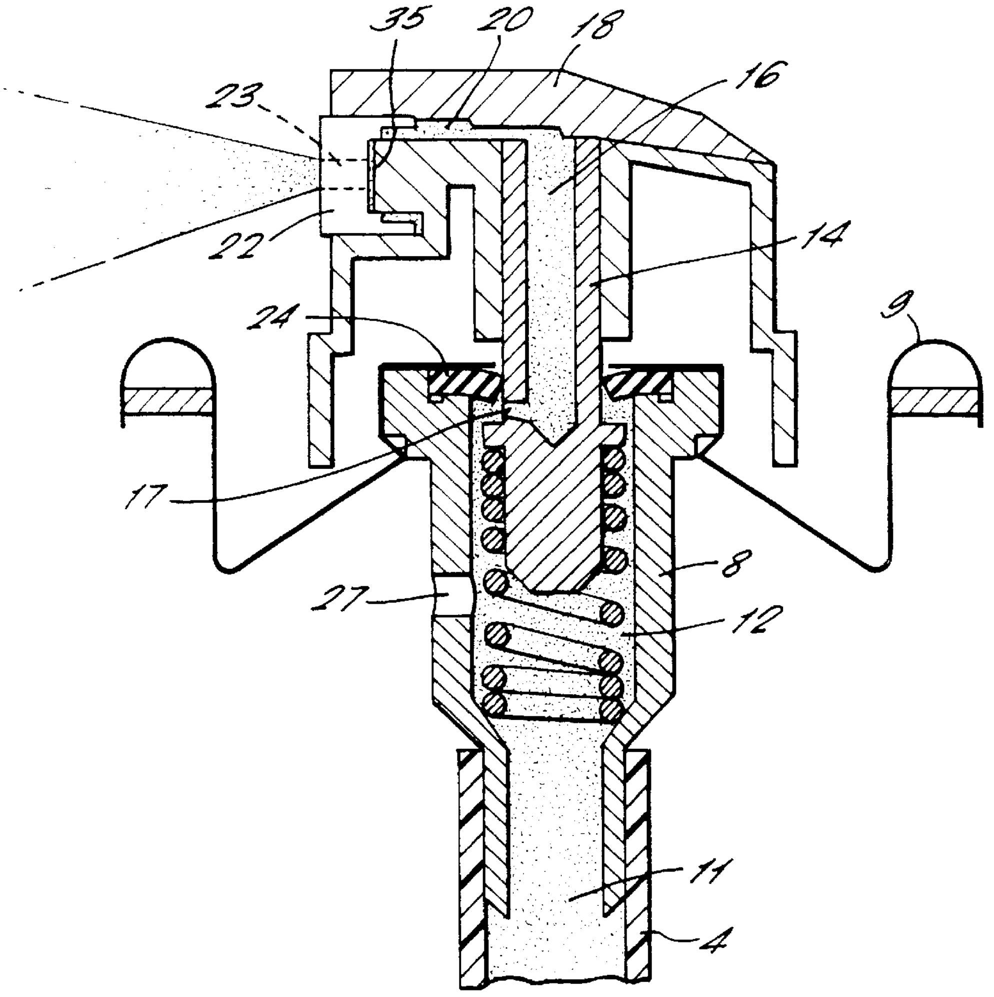
FIG. 2 is a diagrammatic cross section through the valve assembly of the apparatus of FIG. 1.

Referring to FIGS. 1 and 2, an aerosol spray device in accordance with the invention is shown. It comprises a can 1, formed of aluminium or lacquered or unlacquered tin plate or the like in conventional manner, defining a reservoir 2 for a liquid 3 having a conductivity such that droplets of the liquid can carry an appropriate electrostatic charge. Also located in the can is a gas under pressure which is capable of forcing the liquid 3 out of the can 1 via a conduit system comprising a dip tube 4 and a valve and actuator assembly 5. The dip tube 4 includes one end 6 which terminates at a bottom peripheral part of the can 1 and another end 7 which is connected to a tailpiece 8 of the valve assembly. The tailpiece 8 is secured by a mounting assembly 9 fitted in an opening in the top of the can and includes a lower portion 10 defining a tailpiece orifice 11 to which end 7 of the dip tube 4 is connected. The tailpiece includes a bore 12 of relatively narrow diameter at lower portion 11 and a relatively wider diameter at its upper portion 13. The valve assembly also includes a stem pipe 14 mounted within the bore 12 of the tailpiece and arranged to be axially displaced within the bore 12 against the action of spring 15. The valve stem 14 includes an internal bore 16 having one or more lateral openings (stem holes) 17 (see FIG. 2). The valve assembly includes an actuator 18 having a central bore 19 which accommodates the valve stem 14 such that the bore 16 of the stem pipe 14 is in communication with bore 19 of the actuator. A passage 20 in the actuator extending perpendicularly to the bore 19 links the bore 19 with a recess including a post 21 on which is mounted a spraying head in the form of an insert 22 including a bore 23 which is in communication with the passage 20.

A ring 24 of elastomeric material is provided between the outer surface of the valve stem 14 and, ordinarily, this sealing ring closes the lateral opening 17 in the valve stem 14. The construction of the valve assembly is such that when the actuator 18 is manually depressed, it urges the valve stem 14 downwards against the action of the spring 15 as shown in FIG. 2 so that the sealing ring 24 no longer closes the lateral opening 17. In this position, a path is provided from the reservoir 2 to the bore 23 of the spraying head so that liquid can be forced, under the pressure of the gas in the can, to the spraying head via a conduit system comprising the dip tube 4, the tailpiece bore 12, the valve stem bore 16, the actuator bore 19 and the passage 20.

An orifice 27 (not shown in FIG. 1) is provided in the wall of the tailpiece 8 and constitutes a vapour phase tap whereby the gas pressure in the reservoir 2 can act directly on the liquid flowing through the valve assembly. This increases the turbulence of the liquid. It has been found that an increased charge is provided if the diameter of the orifice 27 is at least 0.76 mm.

Preferably the lateral opening 17 linking the valve stem bore 16 to the tailpiece bore 12 is in the form of 2 orifices each having a diameter of not less than 0.51 mm to enhance electrostatic charge generation. Further, the diameter of the dip tube 4 is preferably as small as possible, for example, 1.2 mm, in order to increase the charge imparted to the liquid. Also, charge generation is enhanced if the diameter of the tailpiece orifice 11 is as small as possible eg not more than about 0.64 mm.

Figure 3:
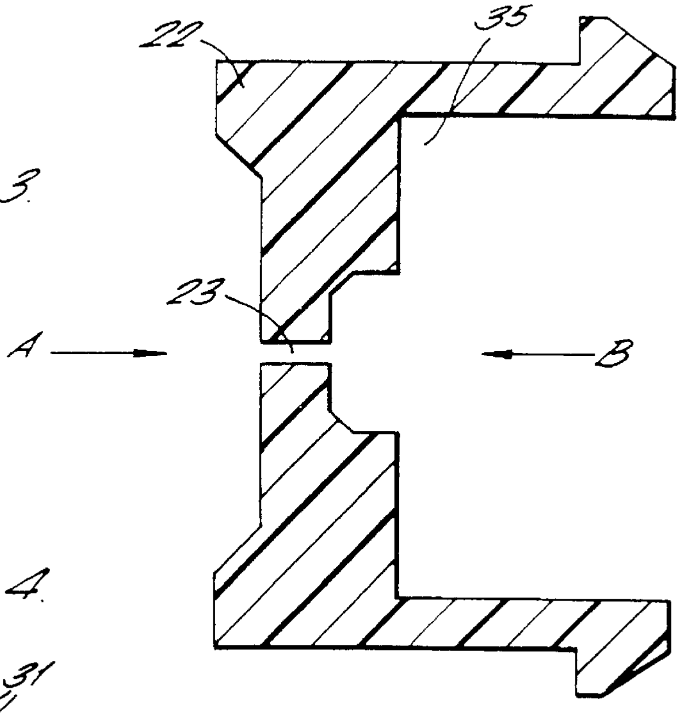
FIG. 3 is a cross section through the actuator insert of the assembly shown in FIG. 2.
Figure 4:
FIG. 4 shows the configuration of the bore of the spraying head shown in FIG. 3 when viewed in the direction A.

Referring now to FIG. 3, there is shown on an increased scale, a cross section through the actuator insert of the apparatus of FIGS. 1 and 2. For simplicity, the bore 23 is shown as a single cylindrical aperture in this Figure. However, the bore 23 preferably has the configuration, for instance, shown in FIG. 4. The apertures of the bore 23 are denoted by reference numeral 31 and the aperture-defining portions of the bore are denoted by reference numeral 30. The total peripheral length of the aperture-defining portions at the bore outlet is denoted by L (in mm) and a is the total area of the aperture at the bore outlet (in $mm^2$) and the values for L and a are as indicated in FIG. 4. L/a exceeds 8 and this condition has been found to be particularly conductive to charge development because it signifies an increased contact area between the actuator insert and the liquid passing there through.

Many different configurations can be adopted in order to produce a high L/a ratio without the cross-sectional area a being reduced to a value which would allow only low liquid flow rates. Thus, for example it is possible to use actuator insert bore configurations (i) wherein the bore outlet comprises a plurality of segment-like apertures (with or without a central aperture); (ii) wherein the outlet comprises a plurality of sector-like apertures; (iii) wherein the aperture together form an outlet in the form of a grill or grid; (iv) wherein the outlet is generally cruciform; (v) wherein the apertures together define an outlet in the form of concentric rings; and combinations of these configurations. Particularly preferred are actuator insert bore configurations wherein a tongue like portion protrudes into the liquid flow stream and can be vibrated thereby. This vibrational property may cause turbulent flow and enhanced electrostatic charge separation of the double layer, allowing more charge to move into the bulk of the liquid.

Figure 5:
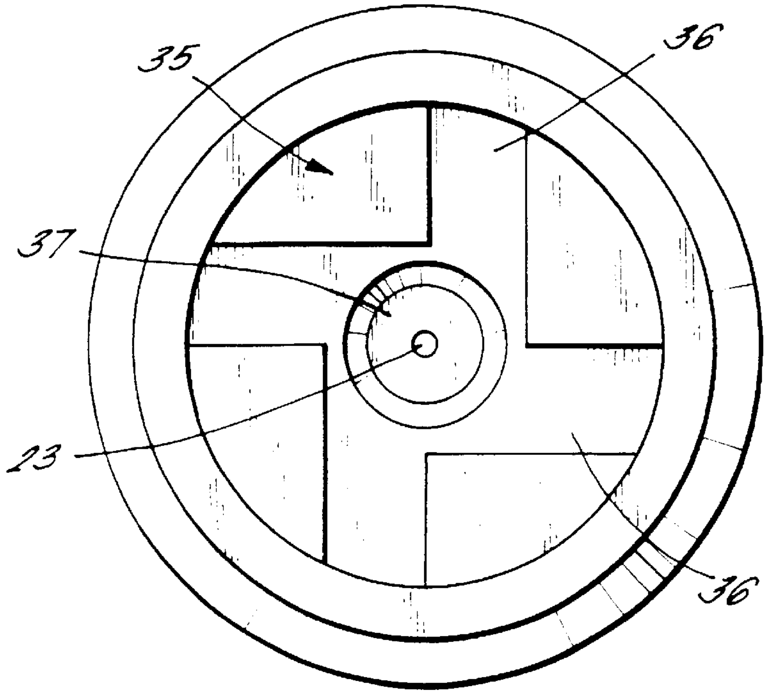
FIG. 5 shows the configuration of the swirl chamber of the spraying head shown in FIG. 3 when viewed in the direction B.

Referring now to FIG. 5, there is shown a plan view of one possible configuration of swirl chamber 35 of the actuator insert 22. The swirl chamber includes 4 lateral channels 36 equally spaced and tangential to a central area 37 surrounding the bore 23. In use, the liquid driven from the reservoir 2 by the gas under pressure travels along passage 20 and strikes the channels 36 normal to the longitudinal axis of the channels. The arrangement of the channels is such that the liquid tends to follow a circular motion prior to entering the central area 37 and thence the bore 23. As a consequence, the liquid is subjected to substantial turbulence which enhances the electrostatic charge in the liquid.

The following Example illustrates the ability of liquid droplets projected from an aerosol spray device to "wrap around" an obscuring object in order to reach a surface located behind that object.

EXAMPLE 1

Figure 6A:
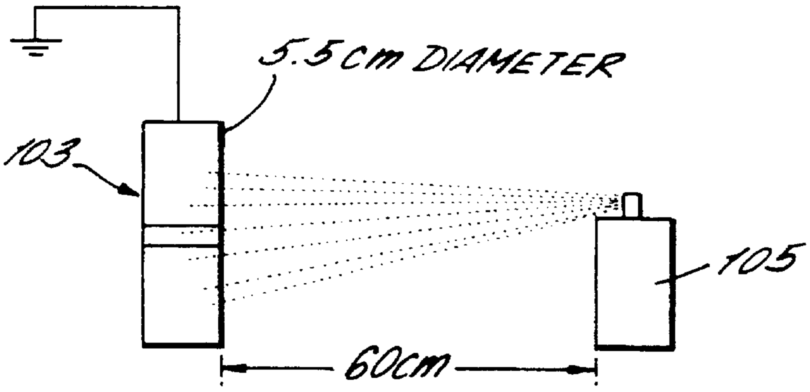
FIG. 6 illustrates composition tests and results showing the efficacy of the present invention.
Figure 6C:
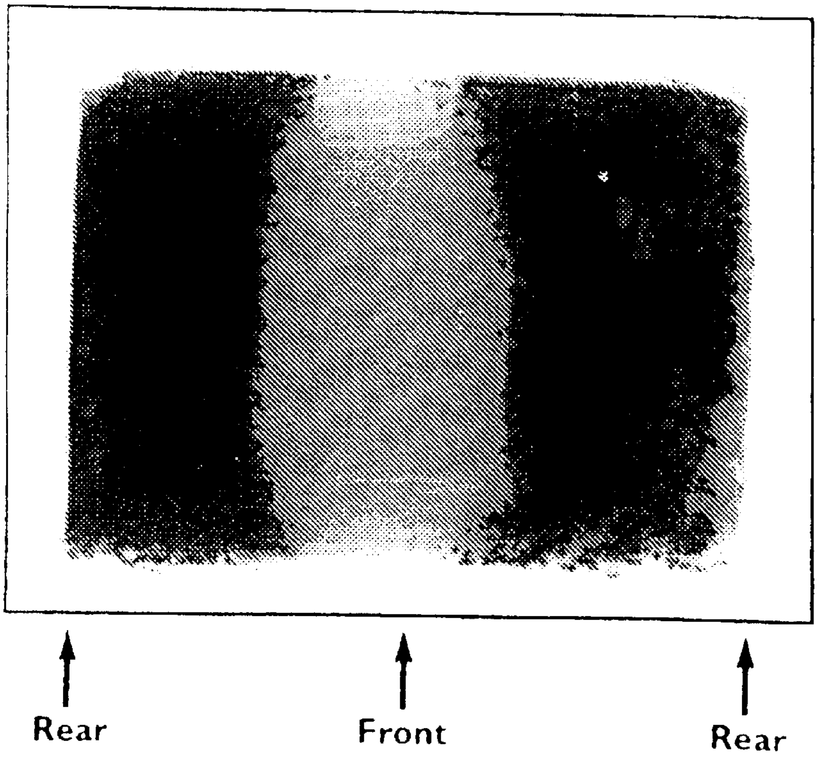
Figure 6B:
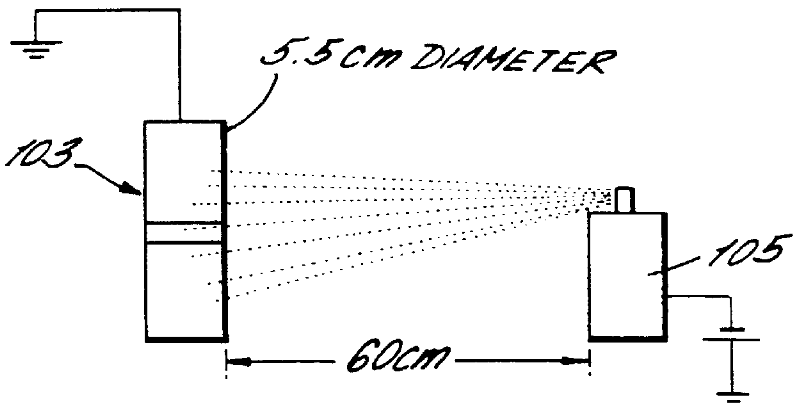
Figure 6D:
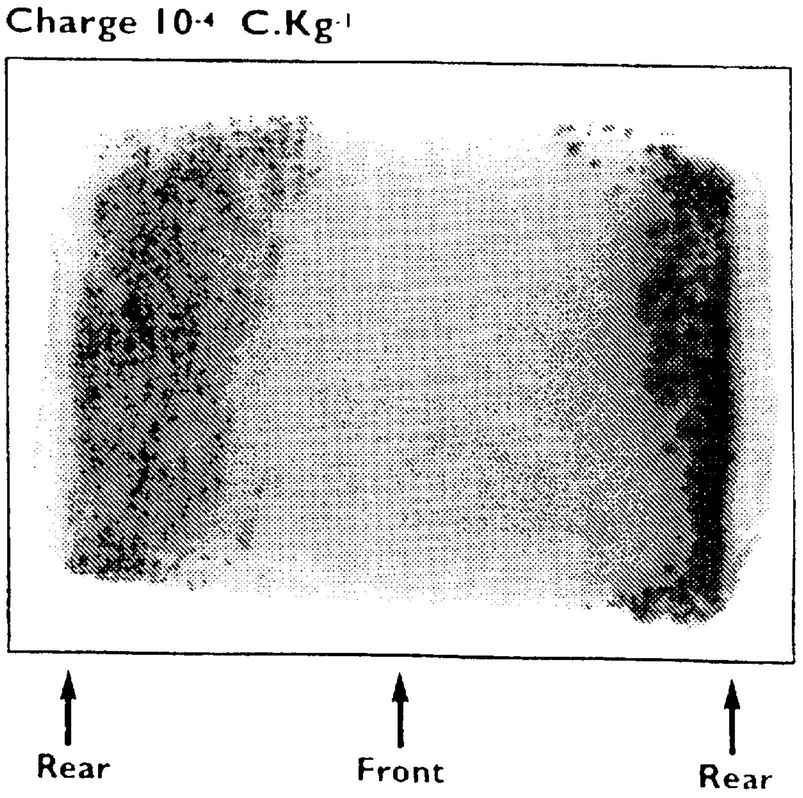

In this Example, a Dettox Antibacterial Room Spray aerosol spray device (Reckitt and Colman Products Limited) was used. The device was tested both in its unmodified form and with an electrostatic charge imparted to the aerosol spray by means of the application of a high voltage to the aerosol can during actuation thereof. Referring to FIG. 6 of the accompanying drawings, FIG. 6A illustrates the arrangement using an unmodified aerosol spray device, whereas FIG. 6B illustrates the use of the aerosol spray device modified by the application of a high voltage to the aerosol can.

A solution containing the bacteria *Serratia marcescens* was sprayed from a pump-action spray onto a sheet of transparent plastic (Item 101 of FIGS. 6C and 6D) thereby leaving a biofilm on this sheet. The sheet was left to air dry for a few minutes. It was then wrapped around an earthed cylinder 103 which was 5.5 cm in diameter. The two ends of the plastic sheet were secured at the rear of the cylinder with double-sided adhesive tape, such that the plastic sheet was continuous around the target cylinder. An aerosol can 105 of Dettox Antibacterial Room Spray was held in a plastic actuating cradle (not shown), positioned 60 cam mechanism from the front face of the cylinder target 103 with the target positioned in the centre of the aerosol plume resulting from actuation of the aerosol can 105. A two second spray of the Dettox product was made, delivering approximately 2.0 grams. The plastic film was then removed from the target, and placed biofilm-side down onto an agar medium of the same size, such that there were no air bubbles between the plastic sheet and the agar. The bacteria were transferred in this way, and the agar was placed in an incubator overnight in order for bacterial colonies to be grown. This procedure was repeated with the Dettox Antibacterial Room Spray aerosol carrying a high electrostatic charge of $-1\times10^{-4}$ C/kg. This was achieved by connecting the can to a high voltage generator and applying −10 KV to the aerosol can during spraying.

After 24 hours the growth of bacterial colonies on the growth medium was assessed and photographed. The resulting photographs are illustrated in FIG. 6C (obtained from the arrangement of FIG. 6A) and FIG. 6D (obtained from the arrangement of FIG. 6B). The bacterial colonies appear as dark areas or dark spots in FIG. 1C and FIG. 1D. The centre of each rectangle was the area located on the front surface of the target and was directly and well treated with the aerosol spray. The areas at the edges of the rectangles were located on the rear surface of the target and accordingly could not be contacted by liquid droplets travelling in a straight line from aerosol can (105) to target (103). FIG. 6C shows that liquid droplets from the unmodified aerosol spray device only contact, and therefore kill, bacteria on the front of the target which were directly in the spray path, but not bacteria on the rear of the target. In contrast, liquid droplets from the modified aerosol spray device which were electrostatically charged, reached the rear of the cylinder and few bacteria survived in this area, i.e. the aerosol spray reached parts of the target which were not directly in the spray path.

What is claimed is:

1. A method of improving the spraying of liquid droplets from a spray device onto a surface which method comprises imparting a unipolar charge to the said liquid droplets by double layer charging during the spraying of the liquid droplets from the spray device, the unipolar charge being at a level such that the said droplets have a charge to mass ratio of at least $+/-1\times10^{-4}$ C/kg, whereby the charged droplets of the liquid are mutually repelled thereby increasing the spread of the droplets from a central spray line extending from the head of the spray device and avoiding coalescence of the droplets, thus providing a a more even coverage of the surface which is to be sprayed.

2. A method of spraying liquid droplets from a spray device onto a surface which is obscured by an object located between the surface and the spray device so that liquid droplets travelling in a straight line from the spray device to the surface will impinge on said object, the method comprising imparting a unipolar charge to the said liquid droplets by double layer charging during the spraying of the liquid droplets from the spray device, the unipolar charge being at a level such that the said droplets have a charge to mass ratio of at least $+/-1\times10^{-4}$ C/kg, whereby at least some of the droplets are caused to travel in a path which avoids the object and impinges on the obscured surface.

3. A method as claimed in claim 1 or claim 2, wherein the spray device is an aerosol spray device.

4. A method as claimed in any one of the preceding claims wherein the spray device contains an emulsion.

5. A method as claimed in any one of the preceding claims wherein the liquid droplets have a diameter in the range of from 5 to 100 micrometers.

6. A method as claimed in any one of the preceding claims wherein the unipolar charge is imparted to the liquid droplets solely by the interaction between the liquid and the spray device, without any charge being imparted thereto from an internal or external charge inducing device.

7. A method as claimed in any one of the preceding claims wherein the droplets charge to mass ratio of at least $+/-1\times10^{-4}$ C/kg is imparted to the liquid droplets as a result of the use of an aerosol spray device with at least one of the features of the material of the actuator, the size and shape of the orifice of the actuator, the diameter of the dip tube, the characteristics of the valve and the formulation of the composition contained in the aerosol spray device being chosen in order to achieve the said droplet charge to mass ratio by double layer charging imparting the unipolar charge to the droplets during the actual spraying of the liquid droplets from the orifice of the aerosol spray device.

8. A method as claimed in any one of the preceding claims wherein the spray device contains a composition comprising an oil phase, an aqueous phase, a surfactant and a propellant.

9. A method as claimed in claim 8 wherein the oil phase includes a $C_9$–$C_{12}$ hydrocarbon.

10. A method as claimed in claim 9 wherein the $C_9$–$C_{12}$ hydrocarbon is present in the composition in an amount of from 2 to 10% w/w.

11. A method as claimed in any one of claims 8 to 10 wherein the surfactant is glyceryl oleate or a polyglycerol oleate.

12. A method as claimed in any one of claims 8 to 11 wherein the surfactant is present in the composition in an amount of from 0.1 to 1.0% w/w.

13. A method as claimed in any one of claims 8 to 12 wherein the propellant is liquified petroleum gas.

14. A method as claimed in claim 13 wherein the propellant is present in the composition in an amount of from 30 to 40% w/w.

15. A method as claimed in claim 2 wherein the object which obscures the surface which it is desired to spray is part of the same article as the article possessing the said surface.

16. A method as claimed in claim 2 or claim 15 wherein the obscured surface which is sprayed in accordance with the present invention is an obscured surface of a sink, shower, toilet, wash basin, a chair leg, a handle of a door, cupboard or refrigerator, a part of a human body, or a part of a plant.

* * * * *